US008323105B2

(12) United States Patent
Chun

(10) Patent No.: US 8,323,105 B2
(45) Date of Patent: *Dec. 4, 2012

(54) PARADISE BOX GAMING CENTER

(76) Inventor: Jay Chun, Hong Kong (CN)

(*) Notice: Subject to any disclaimer, the term of this patent is extended or adjusted under 35 U.S.C. 154(b) by 1101 days.

This patent is subject to a terminal disclaimer.

(21) Appl. No.: 11/897,590

(22) Filed: Aug. 31, 2007

(65) Prior Publication Data

US 2008/0280668 A1 Nov. 13, 2008

Related U.S. Application Data

(63) Continuation-in-part of application No. 11/800,885, filed on May 7, 2007.

(51) Int. Cl.
*A63F 13/00* (2006.01)

(52) U.S. Cl. ........................................... 463/31; 463/25

(58) Field of Classification Search ............. 463/40–42, 463/16–25

See application file for complete search history.

(56) References Cited

U.S. PATENT DOCUMENTS

| | | | |
|---|---|---|---|
| 3,810,627 | A | 5/1974 | Levy |
| 3,909,002 | A | 9/1975 | Levy |
| 4,339,798 | A | 7/1982 | Hedges |
| 4,467,424 | A | 8/1984 | Hedges |
| 4,659,082 | A | 4/1987 | Greenberg |
| 4,861,041 | A | 8/1989 | Jones et al. |
| 4,926,327 | A | 5/1990 | Sidley |
| 5,033,744 | A | 7/1991 | Bridgeman |
| 5,042,818 | A | 8/1991 | Weingardt |
| 5,048,833 | A | 9/1991 | Lamle |
| 5,362,064 | A | 11/1994 | Lofink et al. |
| 5,393,067 | A | 2/1995 | Paulsen |
| 5,395,119 | A | 3/1995 | Jacob et al. |
| 5,395,120 | A | 3/1995 | Malek |
| 5,476,259 | A | 12/1995 | Weingardt |
| 5,605,334 | A | 2/1997 | McCrea |
| 5,639,092 | A | 6/1997 | Macaisa |
| 5,669,606 | A | 9/1997 | Brown |
| 5,673,917 | A | 10/1997 | Vancura |
| 5,707,287 | A | 1/1998 | McCrea |
| 5,735,525 | A | 4/1998 | McCrea |
| 5,762,552 | A | 6/1998 | Vuong et al. |
| 5,770,533 | A | 6/1998 | Franchi |
| 5,779,546 | A | 7/1998 | Meissner |
| 5,788,574 | A | 8/1998 | Ornstein |
| 5,795,225 | A | 8/1998 | Jones |
| 5,800,268 | A | 9/1998 | Molnick |
| 5,806,854 | A | 9/1998 | Coleman |
| 5,830,067 | A | 11/1998 | Graves |

(Continued)

FOREIGN PATENT DOCUMENTS

| | | |
|---|---|---|
| CA | 2377577 | 6/2000 |

(Continued)

OTHER PUBLICATIONS

International Search Report for PCT/CA2006/002069, mailed Mar. 20, 2007, 16 pgs.

(Continued)

*Primary Examiner* — Masud Ahmed

(74) *Attorney, Agent, or Firm* — Jennifer Meredith, Esq.; Meredith & Keyhani, PLLC

(57) ABSTRACT

A centralized gaming system and the method of using the same is disclosed.

26 Claims, 1 Drawing Sheet

U.S. PATENT DOCUMENTS 5,836,818 A 11/1998 Jones
5,842,698 A 12/1998 Brown
5,876,283 A 3/1999 Parra et al.
5,909,876 A 6/1999 Brown
5,911,626 A 6/1999 McCrea
5,921,865 A 7/1999 Scagnelli
5,957,459 A 9/1999 Chae
5,961,119 A 10/1999 Brown
6,001,016 A 12/1999 Walker
6,019,374 A 2/2000 Breeding
6,093,103 A 7/2000 McCrea
6,117,012 A 9/2000 McCrea
6,146,270 A 11/2000 Huard
6,159,095 A 12/2000 Frohm
6,217,447 B1 4/2001 Lofink
6,254,484 B1 7/2001 McCrea, Jr.
6,279,910 B1 8/2001 De Keller
6,293,864 B1 9/2001 Romero
6,345,824 B1 2/2002 Selitzky
6,346,044 B1 2/2002 McCrea, Jr.
6,361,437 B1 3/2002 Walker
6,375,576 B1 4/2002 Margerie
6,409,602 B1 6/2002 Wiltshire
6,460,848 B1 10/2002 Soltys et al.
6,508,709 B1 1/2003 Karmarkar
6,511,072 B1 1/2003 Santa Cruz et al.
6,517,436 B2 2/2003 Soltys
6,540,230 B1 4/2003 Walker
6,569,018 B2 5/2003 Jaffe
6,575,834 B1 6/2003 Lindo
6,582,301 B2 6/2003 Hill
6,588,758 B1 7/2003 Lee
6,626,757 B2 9/2003 Oliveras
6,628,244 B1 9/2003 Hirosawa et al.
6,712,696 B2 3/2004 Soltys
6,719,291 B1 4/2004 deKeller
6,726,564 B2 4/2004 Hogan
6,755,741 B1 6/2004 Rafaeli
6,800,026 B2 10/2004 Cannon
6,808,173 B2 10/2004 Snow
6,837,494 B2 * 1/2005 Lee ................................ 273/292
6,896,614 B2 5/2005 Romero
6,916,245 B1 7/2005 Vancura et al.
7,008,319 B2 3/2006 Montgomery et al.
7,070,505 B2 7/2006 Vancura et al.
7,114,724 B2 10/2006 Ritzer
7,189,161 B1 3/2007 Wiltshire
7,198,272 B2 4/2007 Duhamel
7,213,812 B2 5/2007 Schubert et al.
7,264,241 B2 9/2007 Schubert et al.
7,303,475 B2 12/2007 Britt
7,309,065 B2 * 12/2007 Yoseloff et al. ............... 273/292
7,316,615 B2 1/2008 Soltys
7,325,806 B1 2/2008 Feola
7,367,884 B2 5/2008 Breeding
7,404,765 B2 7/2008 Soltys
7,407,438 B2 8/2008 Schubert
7,419,160 B1 9/2008 D'Ambrosio
7,434,805 B2 10/2008 Grauzer
7,451,987 B1 11/2008 Feola
7,591,728 B2 9/2009 Gioia
7,621,533 B2 11/2009 Kenny
7,731,586 B2 6/2010 Letovsky
7,735,657 B2 6/2010 Johnson
7,753,798 B2 7/2010 Soltys
7,762,889 B2 7/2010 Shigeta
7,769,232 B2 8/2010 Downs
7,780,515 B2 8/2010 Okada
7,914,368 B2 3/2011 Chun
7,918,723 B2 4/2011 Chun
7,922,587 B2 4/2011 Chun
2001/0000118 A1 4/2001 Sines et al.
2001/0029200 A1 10/2001 Romero
2002/0002070 A1 1/2002 Romero
2002/0002073 A1 * 1/2002 Montgomery et al. ......... 463/13
2002/0015489 A1 2/2002 Ben-David
2002/0068635 A1 6/2002 Hill
2002/0072407 A1 6/2002 Soltys et al.
2002/0094869 A1 7/2002 Harkham
2002/0111205 A1 8/2002 Beavers
2002/0115489 A1 8/2002 Jordan
2002/0147042 A1 10/2002 Vuong et al.
2002/0147047 A1 10/2002 Letovsky
2003/0003997 A1 1/2003 Vuong
2003/0013510 A1 1/2003 Vuong et al.
2003/0050107 A1 3/2003 Moody
2003/0064781 A1 4/2003 Muir
2003/0069071 A1 4/2003 Britt
2003/0104854 A1 6/2003 Cannon
2003/0151199 A1 8/2003 Lee
2003/0151201 A1 8/2003 Lee
2003/0232651 A1 12/2003 Huard
2004/0023712 A1 2/2004 Oliver
2004/0023722 A1 2/2004 Vuong
2004/0087357 A1 * 5/2004 Johnson .......................... 463/17
2004/0108656 A1 6/2004 Snow
2004/0116179 A1 6/2004 Nicely
2004/0224777 A1 11/2004 Smith
2004/0235542 A1 * 11/2004 Stronach et al. .................. 463/6
2005/0062227 A1 3/2005 Grauzer et al.
2005/0073102 A1 4/2005 Yoseloff et al.
2005/0218597 A1 10/2005 Parsadaian
2005/0233794 A1 * 10/2005 Cannon et al. .................. 463/16
2006/0052168 A1 3/2006 Shacham
2006/0063577 A1 3/2006 Downs
2006/0071429 A1 4/2006 Okujyo et al.
2006/0103071 A1 5/2006 Ritzer
2006/0128472 A1 6/2006 Beavers
2006/0148547 A1 7/2006 Montgomery
2006/0166726 A1 7/2006 Chun
2006/0178181 A1 8/2006 Chun
2006/0226605 A1 10/2006 Kenny
2006/0287042 A1 12/2006 Osawa
2006/0287058 A1 * 12/2006 Resnick et al. ................. 463/19
2007/0026922 A1 2/2007 Lindo
2007/0026947 A1 2/2007 Chun
2007/0032283 A1 2/2007 Chun
2007/0060259 A1 3/2007 Pececnik
2007/0135204 A1 6/2007 Nicely
2007/0155512 A1 7/2007 Wills
2007/0218968 A1 * 9/2007 Snow et al. ..................... 463/13
2007/0243927 A1 10/2007 Soltys
2007/0243935 A1 10/2007 Huizinga
2008/0009334 A1 1/2008 Walker
2008/0026807 A1 1/2008 Moshal
2008/0076499 A1 3/2008 Lowery
2008/0085769 A1 * 4/2008 Lutnick et al. .................. 463/41
2008/0108400 A1 5/2008 Chun
2008/0113778 A1 5/2008 Chun
2008/0113783 A1 5/2008 Czyzewski
2008/0146311 A1 6/2008 Walker
2008/0194334 A1 8/2008 Kuok
2008/0230993 A1 9/2008 Chun
2008/0254881 A1 * 10/2008 Lutnick et al. .................. 463/31
2008/0280667 A1 11/2008 Chun
2008/0280668 A1 11/2008 Chun
2008/0305855 A1 12/2008 Czyzewski
2009/0029755 A1 1/2009 Chun
2009/0061974 A1 3/2009 Lutnick
2009/0069079 A1 3/2009 Britt
2009/0115133 A1 5/2009 Kelly
2009/0176547 A1 7/2009 Katz
2009/0221360 A1 9/2009 Wooding
2010/0102511 A1 4/2010 Tammesoo
2010/0105457 A1 4/2010 Miller
2010/0105459 A1 4/2010 Miller
2010/0113119 A1 5/2010 Miller
2010/0117299 A1 5/2010 Nicely
2010/0222133 A1 9/2010 Spencer
2010/0255897 A1 10/2010 Pececnik
2010/0295247 A1 11/2010 Laduca
2011/0031694 A1 2/2011 Cohen
2011/0039612 A1 2/2011 Pececnik
2011/0105207 A1 5/2011 Chun
2011/0140362 A1 6/2011 Chun
2011/0159965 A1 6/2011 Chun

FOREIGN PATENT DOCUMENTS

| | | |
|---|---|---|
| EP | 1 101513 | 5/2001 |
| EP | 1892683 | 2/2008 |
| GB | 2408696 | 6/2005 |
| GB | 2430385 | 3/2007 |
| WO | 0079467 | 12/2000 |
| WO | 0217841 | 3/2002 |
| WO | 2005056134 | 6/2005 |
| WO | 2007016035 | 2/2007 |
| WO | 2007099334 | 3/2008 |
| WO | 2008026950 | 3/2008 |
| WO | 2008092385 | 8/2008 |
| WO | 2009107131 | 9/2009 |

OTHER PUBLICATIONS

International Search Report for PCT/CA2006/001295, mailed Nov. 2. 2006, 17 pgs.

*EZ Baccarat*, DP Stud, Inc., www.ezbaccarat.com, 2 pgs. (2003).

* cited by examiner

PARADISE BOX GAMING CENTER

CROSS REFERENCE TO RELATED APPLICATIONS

The present application is a continuation-in-part application of U.S. application Ser. No. 11/800,885, filed on May 7, 2007, the teaching of which is incorporated herein in its entirety by reference.

BACKGROUND OF THE INVENTION

The present invention is generally directed to a gaming system that allows a player to select and play one or more live casino game(s) such as a live baccarat game and/or a non-live casino game(s).

In casino games, such as the baccarat game, there is generally a count-down time during which a player of the game will need to wait for the count-down result. This waiting period results in frustration of the player, waste of the resource of the gaming establishment, and, as the result, reduced revenue by the gaming establishment.

Additionally, casino games are generally ad hoc in nature. Games in a casino resort are generally played around the resort in several locations. Player(s) therefore have to go around the casino resort to select, view or play casino games. This also leads to waste of time, and, as the result, reduced revenue by the gaming establishment.

The embodiments described below address the above-described issues and needs.

SUMMARY OF THE INVENTION

The present invention provides a centralized gaming center in a casino resort. The gaming system comprises a computer server and a cabinet that allows a player to play any one or more games the player selects. All the games in one casino resort or several casino resorts can be linked to the computer server via a network. The network can be wired network or wireless network. The cabinet can include one, two, three, four, or several screens for displaying live casino games or non-live casino games. The cabinet can also include features such as key pads or key boards allowing a player to select a desired game or desired games and features common in a casino gaming terminal.

In some embodiments, the gaming system or gaming center allows a player to play a baccarat game and one or more other casino game. The one or more other casino games can be another baccarat game or a non-baccarat game. In some embodiments, the non-baccarat game can be a slot machine game, a casino card game, or a felt-table games. In some embodiments, the casino games are live casino games such as a baccarat game, a Sic Bo game, a Roulette game, a Fish-Prawn-Crab game, or a Wheel of Fortune game. In some embodiments, the casino game can be a non-live casino game such as a slot machine game. In some embodiments, the casino game can be video server based games including video slot games and other form of video games while players could also use many forms of mechanism including using touch screen mechanism to participate in the process.

In some embodiments, the main cabinet comprises a upper screen and a lower screen for playing the live casino game described above. The screen for displaying the non-live casino game, e.g., slot machine game, can be stand-alone screen or can be connected to the main cabinet. The screen for displaying the slot machine game can be fixed or foldable. In some embodiments, the screen for displaying the slot machine game is connected to the main cabinet, e.g., either connected to the upper screen or connected to the lower screen through a connection mechanism. The connection mechanism can be a hinge(s) or an arm(s). In some embodiments, the connection mechanism is integrated extension of the main cabinet, e.g., the upper or the lower screen. In some embodiments, the connection mechanism comprises hinge(s) (e.g., one, two, three or more hinges), allowing the screen for displaying the non-live casino game such as slot machine game to be folded to the main cabinet to cover up the upper screen or the lower screen. In some embodiments, the connection mechanism comprises a metallic arm or metallic arm(s) (e.g., one, two, three, or more arms).

In some embodiments, the screen for displaying a non-live casino game such as slot machine game and/or the live casino game such as live baccarat game can also allow the playing of non-live casino game such as slot machine games or baccarat games based on a stand alone server.

The mechanism for playing a casino game is well known in the art of gaming. Systems (e.g., devices and apparatus) or parts or components thereof embodying such gaming mechanism or a part thereof is either commercially available or can be readily constructed or built by an ordinary artisan.

In some embodiments, the present invention also provides a software program or a set of software programs for carrying out any or all steps of the betting method described herein. The gaming system can also be incorporated into an electronic device or an entertainment gaming machine. Representative electronic devices include, but are not limited to, laptop computers or desktop computers.

DETAILED DESCRIPTION

Figures 1A, 1B, 1C, 1D, 1E, 1F:
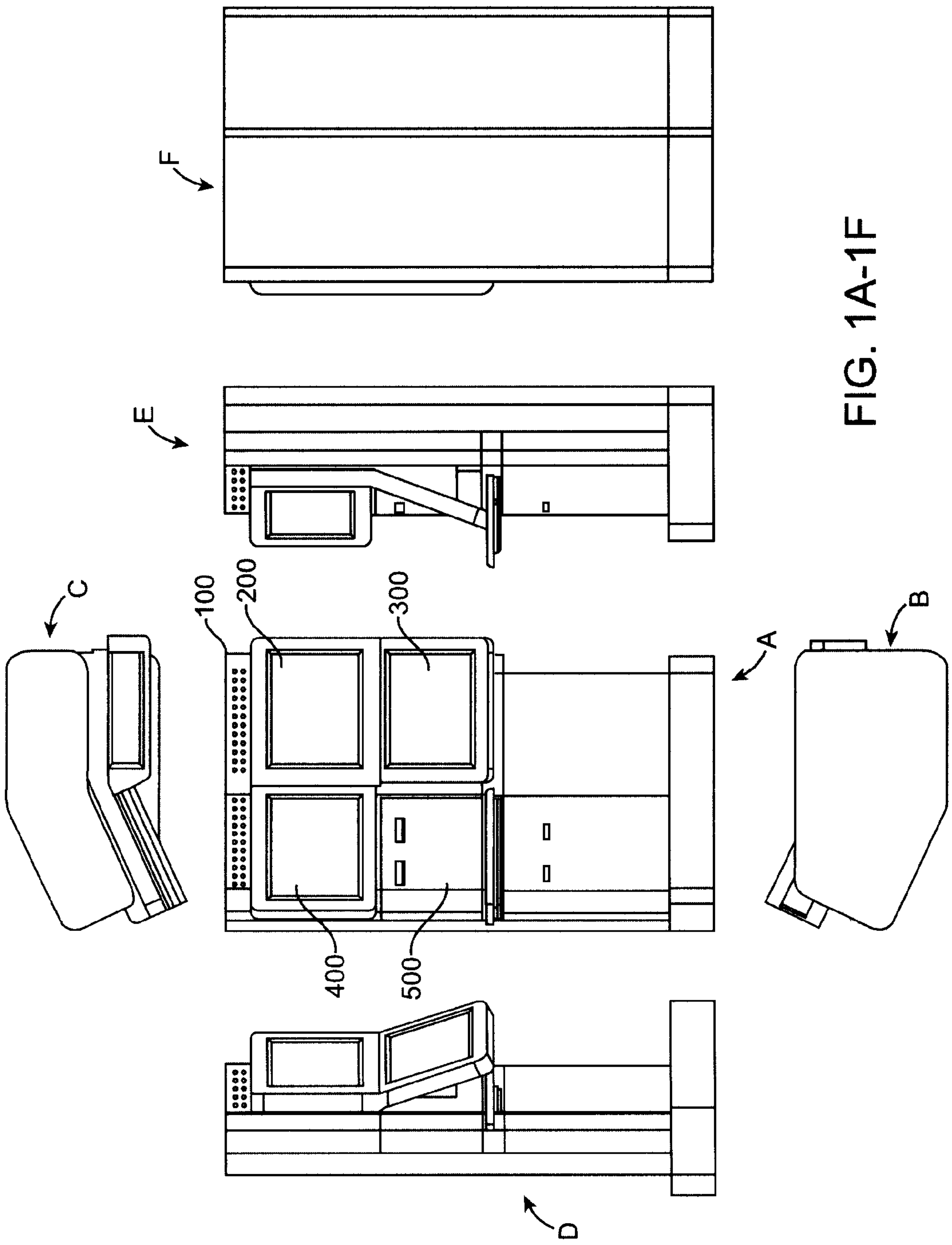
FIGS. 1A-1F shows an embodiment of the present invention.

The present invention provides a centralized gaming center in a casino resort. The gaming system comprises a computer server and a cabinet that allows a player to play any one or more games the player selects. All the games in one casino resort or several casino resorts can be linked to the computer server via a network. The network can be wired network or wireless network. The cabinet can include one, two, three, four, or several screens for displaying live casino games or non-live casino games. The cabinet can also include features such as key pads or key boards allowing a player to select a desired game or desired games and features common in a casino gaming terminal.

In some embodiments, the gaming center includes a Paradise Box Gaming System as described in U.S. application Ser. No. 11/800,885 with the server described above installed in the Paradise Box Gaming System.

In some embodiments, the gaming system or gaming center allows a player to play a baccarat game and one or more other casino game. In some embodiments, the gaming system includes a computer server. The one or more other casino games can be another baccarat game or a non-baccarat game. In some embodiments, the non-baccarat game can be a slot machine game, a casino card game, or a felt-table games. In some embodiments, the casino games are live casino games such as a baccarat game, a Sic Bo game, a Roulette game, a Fish-Prawn-Crab game, or a Wheel of Fortune game. In some embodiments, the casino game can be a non-live casino game such as a slot machine game. In some embodiments, the casino game can be video server based games including video slot games and other form of video games while players could also use many forms of mechanism including using touch screen mechanism to participate in the process.

In some embodiments, the main cabinet comprises a upper screen and a lower screen for playing the live casino game described above. The screen for displaying the non-live casino game, e.g., slot machine game, can be stand-alone screen or can be connected to the main cabinet. The screen for displaying the slot machine game can be fixed or foldable. In some embodiments, the screen for displaying the slot machine game is connected to the main cabinet, e.g., either connected to the upper screen or connected to the lower screen through a connection mechanism. The connection mechanism can be a hinge(s) or an arm(s). In some embodiments, the connection mechanism is integrated extension of the main cabinet, e.g., the upper or the lower screen. In some embodiments, the connection mechanism comprises hinge(s) (e.g., one, two, three or more hinges), allowing the screen for displaying the non-live casino game such as slot machine game to be folded to the main cabinet to cover up the upper screen or the lower screen. In some embodiments, the connection mechanism comprises a metallic arm or metallic arm(s) (e.g., one, two, three, or more arms).

In some embodiments, the screen for displaying a non-live casino game such as slot machine game and/or the live casino game such as live baccarat game can also allow the playing of non-live casino game such as slot machine games or baccarat games based on a stand alone server.

The mechanism for playing a casino game is well known in the art of gaming. Systems (e.g., devices and apparatus) or parts or components thereof embodying such gaming mechanism or a part thereof is either commercially available or can be readily constructed or built by an ordinary artisan.

In some embodiments, the present invention also provides a software program or a set of software programs for carrying out any or all steps of the betting method described herein. The gaming system can also be incorporated into an electronic device or an entertainment gaming machine. Representative electronic devices include, but are not limited to, laptop computers or desktop computers.

The rules of playing each casino game is well known in the art and well documented. Sometimes, rules for a game can be provided by gaming authorities. For examples, Macao Special Administrative Region the Gaming Inspection and Coordination Bureau of Macao Special Administrative Region, China, provides rules for rules for each casino games played in the region (http://www.dicj.gov.mo/CH/index.htm).

Rules for a few representative casino games are described below.

Live Baccarat Game

Baccarat games are common casino games. The object of baccarat is for the bettor to successfully wager on whether the banker's hand or the player's hand is going to win. The bettor receives even money for his wager if he selects the winning hand and loses his wager if he selects the losing hand. Because of the rules of play of baccarat, the banker's hand has a slightly higher chance of winning than does the player's hand. Therefore, if the bettor wagers on the banker's hand, the bettor is required to pay to the gaming establishment a commission (typically 5%) of the amount the bettor wins. No commission is paid if the bettor successfully wagers on the player's hand.

Conventional methods of playing baccarat are described as follows:

A multiple number of decks of standard playing cards, 52 in number, are used; typically six to twelve decks are shuffled together and placed in a shoe from which the cards are dealt during the play of the game.

Each bettor makes a wager on whether the banker's hand or the player's hand will win. After all wagers are made, two cards are dealt from the shoe to the bank position and two cards are dealt from the shoe to the player's position on the table layout. The cards are turned face up and the value of the banker's hand and the player's hand is determined.

Aces count as one; kings, queens, jacks and tens count as zero and the other cards count as their respective face value. The suits (hearts, diamonds, spades and clubs) have no meaning in baccarat. The highest hand value in baccarat is nine. All hand values range from a low of zero to a high of nine. If when the cards are added together, the total of the hand exceeds nine, then the hand value is determined by subtracting ten from the total of the hand. For example, a seven and nine total sixteen, but the hand value is six. An Ace and a nine total ten, but the hand value is zero.

A two card total of eight or nine is called a "natural"; a two card total of zero is called a "baccarat". As will be explained hereafter, in certain situations in the play of the game, a third card will be dealt. The value of this third card is added to the total of the first two cards and a new hand value is established. Again, if the new hand total exceeds nine, the hand value is determined by subtracting ten from the total of the hand. Wagering locations are provided on the baccarat table layout. Whichever of the banker's hand or the player's hand is closest to a total of nine is the winner.

The way of betting may differ in different gaming establishments. In the U.S., for example, prior to the deal, each bettor can make one of three wagers: 1) that the banker's hand will win, 2) that the player's hand will win, or 3) that the banker's hand and the player's hand will tie. In Macau, for example, one can make one of five wagers: 1) that the banker's hand will win, 2) that the player's hand will win, 3) that the banker's hand and the player's hand will tie, 4) that the first two cards in the banker's hand are of the same kind, regardless of the type of suit, forming a Bank Pair, or (5) that the first two cards in the player's hand are of the same kind, regardless of the type of suit, forming a Player Pair.

All winning banker's hand wagers in scenario 1) in both the U.S. and Macau are paid off at odds of one-to-one and the house charges a five percent (5%) commission on the amount won by the bettor. For example, if a bettor wagers $100 on the banker's hand and the banker's hand wins, the bettor wins $100 and is charged a $5 commission on the amount that the bettor won. The bettor is not charged any commission on the amount of his wager.

All wagers that select winning player's hand in scenario 2) in both the U.S. and Macau are paid off at odds of one-to-one and the bettor is not charged any commission on the amount of his winnings or his wager.

All winning wagers on the tie in scenario 3) in both the U.S. and Macau can be paid off at odds of eight-to-one (depending on the gaming establishment) and the bettor is not charged any commission on the amount of his winnings or his wager. If a tie hand occurs, all wagers on the banker's hand and all wagers on the player's hand are "pushes" and the amount wagered is returned to the bettor.

All winning wagers on the Bank Pair bet in scenario 4) in Macau can be paid off at odds of eleven-to-one (depending on the gaming establishment) and the bettor is not charged any commission on the amount of his winnings or his wager.

All winning wagers on the Player Pair bet in scenario 5) in Macau can be paid off at odds of eight-to-one (depending on the gaming establishment) and the bettor is not charged any commission on the amount of his winnings or his wager.

The play of baccarat typically uses three casino dealers to operate the game. The casino dealers jointly participate in the shuffling of the decks of cards. After the shuffle is completed, one of the players is typically asked to cut the decks using a plastic cut card. The dealer then separates and restacks the cards from the point of the cut and the dealer or a player then inserts the plastic cut card no less than fifteen cards (in Las Vegas, U.S.) or no less than twelve cards (in Macau) from the ends of the stacked decks and the entire stacked decks are placed into a shoe from which the cards are dealt during the play of the game. When the inserted plastic cut card appears during play, the hand in progress is completed and that round of play then ends. The cards are reshuffled to prepare for the next round of baccarat.

In conventional baccarat, the bettors deal the cards used in the game. Initially, one of the casino dealers (called the "caller") passes the shoe to the bettor sitting in seat number "1" at the baccarat table. After all wagers have been made, the caller tells the bettor with the shoe to begin the deal. The bettor deals a first card to the caller, a first card to himself, a second card to the caller and a second card to himself. All cards are dealt face down. The two cards given to the caller represent the player's hand and the two cards kept by the bettor who is dealing the cards represent the banker's hand.

The caller than allows one of the other bettors to turn up the player's hand. Traditionally, this honor is given to the bettor who has made the largest wager. The bettor turns up the two cards of the player's hand and tosses them to the caller. The caller places these two cards face up in the table location designated for the "player's hand" and the caller announces the point total of the player's hand.

The bettor who has the shoe then turns over the cards of the banker's hand and tosses these two cards to the caller. The caller places these two cards face up in the table location designated for the "banker's hand" and the caller announces to point total of the banker's hand. Depending on the point total of the player's hand and the banker's hand, one more card may be dealt to either the player's hand, the banker's hand, or both. The rules for determining whether a third card is dealt are fixed rules, there is no discretion for either the player's hand or the banker's hand on whether a third card is dealt.

If either the player's hand or the banker's hand has a point total of eight or nine on the first two cards, no third card is dealt to either hand and the hand with the highest point total is the winner (or the hand is a tie, as the case may be). If none of the player's hand or the banker's hand has a point total of eight or nine, then there is a possibility of a third card draw.

The third card draw rules are as follows:

Rule #1: If the initial two card player's hand has a point total of 0, 1, 2, 3, 4 or 5, draws a third card. If the initial two card player's hand has a point total of 6 or 7, the player's hand stands and does not receive a third card.

Rule #2: If the player's hand stands and does not draw a third card, then the banker's hand follows Rule #1. In other words, if the player's hand has a point total of 6 or 7, the banker's hand draws a third card on a point total of 0, 1, 2, 3, 4 or 5 and the banker's hand stands on a point total of 6 or 7.

Rule #3: If the player's hand draws a third card, the banker's hand must draw or stand as described in Table 1.

TABLE 1

| Bank hand two card point total | Bank hand draws when the player's hand third card is: | Bank hand stands when the player's hand third card is: |
|---|---|---|
| 0, 1 or 2 | Bank always draws | — |
| 3 | 0, 1, 2, 3, 4, 5, 6, 7 or 9 | 8 |
| 4 | 2, 3, 4, 5, 6 or 7 | 0, 1, 8 or 9 |
| 5 | 4, 5, 6 or 7 | 0, 1, 2, 3, 8 or 9 |
| 6 | 6 or 7 | 0, 1, 2, 3, 4, 5, 8 or 9 |
| 7 | — | Bank always stands |

All third card draw determinations are automatically made by the caller who is skilled in the game of baccarat. When the rules of baccarat require a third card for the player's hand, the caller will request a card for the player's hand. After the player's hand is completed, the banker's hand is completed in the same fashion. The caller then declares which hand has the highest point total and declares that hand the winner (or the caller declares a tie hand as the case may be).

In conventional baccarat the bettor who acts as the dealer continues to deal the cards until the player's hand wins. As soon as the player's hand wins, it is customary to pass the shoe counterclockwise around the baccarat table to the next bettor so that each bettor has the opportunity to deal the cards. Any bettor may decline to deal the cards. The fact that one of the bettors is physically dealing the cards has no affect on the outcome of the game because the rules for drawing and standing do not allow any discretion on the part of the players. The conventional baccarat rules can vary in different gaming jurisdictions. For example, in Macao, all other felt games must be handled by licensed and registered persons.

The players can play the game according to conventional baccarat rules, which may vary from place to place. In one embodiment, the baccarat game is played according to the U.S. rules as used in Las Vegas.

In another embodiment, the baccarat game is played according to the baccarat rules promulgated by the government of Macau Special Administration Region. In Macao, only dealers are eligible to touch the shoe at all time unless on very special situation in VIP rooms. In live baccarat game in Macau, all cards are being handled by licensed and registered dealers representing the concessionary holders (e.g., one of the 6 concessionary holders in Macao, namely, SJM, Galaxy, MGM, LVS etc).

Roulette

Roulette games are generally grouped into two categories: the European Roulette or English Roulette or the American Roulette. The following provides a general description of the game of Roulette and the rules playing the game.

American Roulette

The Wheel

The game of American Roulette is played on a wheel which consists of thirty-eight slots, each with its own number. The numbers on a Roulette wheel are 1-36, 0, and 00. The numbers alternate pairs of odd numbers with pairs of even numbers. The numbers also alternate between black and red. Both the 0 and 00 slots are green. A dealer, or croupier spins the wheel in one direction and then rolls a small ball in the other direction. The ball then drops into one of the slots as it begins to slow down.

The Table

The table is designed so that the numbers, not including 0 and 00, are lined up into three columns, each of twelve numbers, the first row is 1,2,3; the second row is 4,5,6 and so on. The rest of the table is devoted to the myriad bets the game entails. Betting is broken down into two major categories, inside bets and outside bets. There is no limit to the number of bets one can play Inside Bets Straight Bets This is betting that one particular number on the wheel will come up. This bet is done by placing a chip on top of the number on which you want to bet. If that number wins, the payoff is 35 to 1.

Split Bets

This is betting that one of two numbers that lie next to each other on the table will win. Placing a chip on the line that separates two numbers does this. You win if the ball lands on either number. The payoff is 17 to 1.

Street Bet, Trio Bet, or Three Number Bet

In this bet, a player is wagering that any number in a particular row will hit on the next spin. To make this bet, you must place a chip in the outside line of the row on which you want to bet. You win if any number in the row comes up. The payoff is 11 to 1.

Corner Bet, Square Bet, or Four-Number Bet

This bets that one of four numbers will hit on the next spin. The numbers should all be touching and moving a chip into the center of four numbers places the bet. If one of these numbers comes up, you win. This bets pays 8 to 1.

Five-Number Bet

This is betting that either the 0, 00, 1, 2, or 3 will come up on the next roll. To take this bet, place a chip on the outside line that divides the 0 and 1. You will be paid 6 to 1 if any of these numbers come up.

Six Line bet

This is betting that one of six numbers in two adjacent rows will come up. Place a chip in between two rows on the outside line. If the ball lands on any number in the two rows, you will be paid 6 to 1.

Outside Bets

Red

You are betting that the next number to come up is a red. If the next number landed is red, you will be paid 1 to 1, or even money. To play this bet, place a chip on the box marked "Red".

Black

You are betting that the next number to come up is a black. If the next number landed is black, you will be paid 1 to 1, or even money. To play this bet, place a chip on the box marked "Black".

Even

This is wagering that the ball will land on an even number. This bet does not include 0 or 00. The payoff is 1 to 1. To play this bet, place a chip on the box marked "Even".

Odd

This is wagering that the ball will land on an odd number. The payoff is 1 to 1 if the next number to come up is odd. To play this bet, place a chip on the box marked "Odd".

Low Bet

This is a bet that the next number will be between 1 and 18. The payout is 1 to 1. To play this bet, place a chip on the box marked "Low".

High Bet

This is a bet that the next number will be between 19 and 36. The payout is 1 to 1. To play this bet, place a chip on the box marked "High".

Dozen Bet

These bets divide the table into the numbers 1-12, 13-24, and 25-36. To play this bet, put a chip in one of the three boxes marked "1st 12", "2nd 12" or "3rd 12". This bet pays 2 to 1.

Column Bet

This bets that a number in a particular column will come up on the next spin. The payoff is 2 to 1 and is done by placing a chip at the end of the layout below your desired column where it is marked "2 to 1".

English Roulette

The major difference between English and American Roulette is that English has only a 0 instead of both 0 and 00.

Sic Bo

Sic Bo is an ancient Chinese game meaning 'Dice Pair'. It is played in Southeast Asia, Korea, Nevada and Australia. It is also popular in the Philippines, where it is called 'Hi-Lo'. Sic Bo is played with three dice. The object of the game is to select the individual numbers, or combinations of numbers, that will appear on the dice after the 'throw'.

The possibilities include single dice numbers, two of a kind, three of a kind, or combinations of any two or three of the dice. These are displayed along with payoff odds on the table's layout.

To start, the players make their selection of a possible outcome and place a bet on a chosen possibility. After the bets are made, the dice tumbler is rotated and then set on the table. All winning possibilities of the three dice appear illuminated on the layout.

Winning payoffs range from 1:1 even money for one-of-a-kind, to 180:1 for a specific trio.

Slot Machine Games

Slot machine games are common in all the casino resorts. The rules and general steps of playing a slot machine game is described below:

1. Click "Insert Money" to begin playing.
2. Place one's bet by choosing credits in the denominations offered. The player can usually adjust his/her bet on the left side of the slot machine.
3. View one's balance in the slot machine's credit box.
4. The player can bet the maximum limit by clicking on "Bet Max."
5. If the player does not want to bet the maximum, he/she can click on "Bet One" for individual credits.
6. If the player hits a winning combination, he/she can see your payout on the Payout Table. To check and see how much he/she has won, click on the "Winner Paid" icon.
7. It's usually possible to switch machines while playing the same game. Check for a "Switch Machine" button if you want to try your luck somewhere else.

Description of the Gaming System

The gaming system described herein can be in any design. FIGS. 1A-1F show an embodiment of the present invention.

FIG. 1A, the gaming system includes a main cabinet 100, a server (not shown), screen 200, screen 300, screen 400, and betting terminal 500. The server can be a stand alone server or included in main cabinet 100 and can include a chip, a memory, and optionally a database. The server is either commercially available or can be readily constructed by a person of ordinary skill in the art. Screens 200, 300 and 400 can display live casino games or non-live casino games. Betting terminal 500 comprises mechanisms (not shown) that allow a player to place a bet on a live casino game or a non-live casino game. The gaming system also includes a mechanism for selecting one or more live casino game(s) (not shown) and a mechanism for playing the one or more live casino game(s) (not shown). The gaming system can also include a mechanism for selecting one or more non-live casino game(s) (not shown) and a mechanism for playing the one or more non-live casino game(s) (not shown). Note, the mechanisms for selecting or playing one or more live or non-live casino game(s) can be included in any place in the gaming system.

FIG. 1B shows the bottom view of the gaming system shown in FIG. 1A.

FIG. 1C shows the top view of the gaming system shown in FIG. 1A.

FIGS. 1D-1E show two perspective views of the gaming system shown in FIG. 1A.

FIG. 1F shows the side view of the gaming system shown in FIG. 1A.

A person of ordinary skill in the art can readily construct a gaming system or device according to the above description.

While particular embodiments of the present invention have been shown and described, it will be obvious to those skilled in the art that changes and modifications can be made without departing from this invention in its broader aspects. Therefore, the appended claims are to encompass within their scope all such changes and modifications as fall within the true spirit and scope of this invention.

I claim:

1. A gaming system comprising a main cabinet in a casino and a computer server, the system comprising:

a mechanism in a main cabinet in a casino for selecting and playing one or more live casino game(s) by a player, a mechanism in said main cabinet in a casino for selecting and playing one or more casino slot machine game(s) by said player, one or more screen(s) in said main cabinet in a casino for displaying the one or more live-casino game(s) to said player wherein the one or more live casino game(s) are offered in at least one casino resort, and one or more second additional screen(s) in said main cabinet in a casino for displaying the casino slot machine game(s) to said player wherein said casino slot machine game(s) is offered in at least one casino resort, wherein said one or more second additional screen is above said screen in said main cabinet in a casino for displaying the one or more live-casino game(s) to said player, wherein the mechanism for playing one or more casino slot machine game(s) is adapted to receive second bets from said player while the player awaits results of first bets placed on the mechanism for playing the one or more live casino game(s) by a player during the countdown time of said one or more live casino games.

2. The gaming system, wherein the computer server is a stand alone server or included in the mechanism for selecting and playing one or more live casino game(s).

3. The gaming system of claim 1, wherein the one or more live casino game(s) is a live baccarat game.

4. The gaming system of claim 3, wherein the one or more live casino game(s) further include a casino card game, a felt-table game, Sic Bo game, a Roulette game, a Fish-Prawn-Crab game, or a Wheel of Fortune game.

5. The gaming system of claim 1, wherein the casino slot machine game is a video server based game.

6. The gaming system of claim 5, wherein the casino slot machine game is a video server based slot machine game.

7. The gaming system of claim 1, wherein the mechanism for selecting and playing one or more live casino game(s) comprises a touch screen.

8. The gaming system of claim 1, wherein the mechanism for selecting and playing one or more casino slot machine game(s) comprises a touch screen.

9. The gaming system of claim 3, wherein the casino slot machine game is a slot machine game.

10. The gaming system of claim 1, wherein the one or more screen(s) for displaying the one or more live-casino game(s) comprises a upper screen and a lower screen.

11. The gaming system of claim 10, wherein the one or more screen(s) for displaying the casino slot machine game(s) is connected to the upper screen or the lower screen through a connection mechanism.

12. The gaming system of claim 11, wherein the connection mechanism comprises a hinge(s) or an arm(s).

13. The gaming system of claim 12, wherein the connection mechanism comprises a hinge(s), allowing the one or more screen(s) for displaying the casino slot machine game(s) to be folded to the main cabinet to cover up the upper screen.

14. The gaming system of claim 12, wherein the connection mechanism comprises a metallic arm(s).

15. The gaming system of claim 10, wherein the one or more screen(s) for displaying the casino slot machine game(s) is either connected to and integratedly extended from the upper screen or the lower screen.

16. The gaming system of claim 15, wherein the one or more screen(s) for displaying the casino slot machine game(s) is folded or fixed.

17. The gaming system of claim 1, wherein the one or more live casino game(s) are connected to the computer server by a wired or wireless network.

18. The gaming system of claim 1, wherein the one or more live casino game(s) are offered in a single casino resort.

19. The gaming system of claim 1, wherein the one or more live casino game(s) are offered in multiple casino resorts.

20. A method of playing casino games, comprising using a gaming system to play one or more live casino game(s) and optionally one or more casino slot machine game(s), wherein the system comprises:

a mechanism in a main cabinet in a casino for selecting and playing one or more live casino game(s) by a player, a mechanism in said main cabinet in a casino for selecting and playing one or more casino slot machine game(s) by said player, one or more screen(s) in said main cabinet in a casino for displaying the one or more live-casino game(s), and one or more second screen(s) in said main cabinet in a casino for displaying the casino slot machine game(s), wherein said one or more second additional screen is above said screen in said main cabinet in a casino for displaying the one or more live-casino game(s) to said player, wherein the mechanism for playing one or more casino slot machine game(s) is adapted to receive second bets from said player while the player awaits results of first bets placed on the mechanism for playing the one or more live casino game(s) by a player during the countdown time of said one or more live casino games.

21. The method of claim 20, wherein the live casino game(s) is live baccarat.

22. The method of claim 20, wherein the one or more live casino game(s) further include a casino card game, a felt-table game, Sic Bo game, a Roulette game, a Fish-Prawn-Crab game, or a Wheel of Fortune game.

23. The method of claim 20, wherein the casino slot machine game is a video server based game.

24. The method of claim 23, wherein the casino slot machine game is a video server based slot machine game.

25. The method of claim 20, wherein the mechanism for selecting and playing one or more live casino game(s) comprises a touch screen.

26. The method of claim 20, wherein the mechanism for selecting and playing one or more casino slot machine game(s) comprises a touch screen.

* * * * *